US005164741A

United States Patent [19]

Kaneko et al.

[11] Patent Number: 5,164,741

[45] Date of Patent: Nov. 17, 1992

[54] APPARATUS AND METHOD FOR FORMING COLOR IMAGE

[75] Inventors: Shuzo Kaneko; Toshikazu Ohnishi; Takashi Kai, all of Kanagawa; Kazuo Yoshinaga, Tokyo, all of Japan

[73] Assignee: Canon Kabushiki Kaisha, Tokyo, Japan

[21] Appl. No.: 514,713

[22] Filed: Apr. 26, 1990

[30] Foreign Application Priority Data

Apr. 27, 1989 [JP] Japan ................................ 1-106017

[51] Int. Cl.$^{5}$ ................................ G01D 9/00

[52] U.S. Cl. ................................ 346/1.1; 346/76 PH; 346/76 L; 346/108; 359/45; 359/103; 359/43

[58] Field of Search ................ 346/1.1, 76 PH, 76 L, 346/108; 350/330, 346, 350 R, 350 S, 350 F, 351

[56] References Cited

U.S. PATENT DOCUMENTS

| | | | |
|---|---|---|---|
| 4,734,359 | 3/1988 | Oguchi et al. | 430/945 |
| 4,777,492 | 10/1988 | Ohnishi et al. | 346/1.1 |
| 4,965,091 | 10/1990 | Kurabayashi et al. | 346/108 |
| 4,965,591 | 10/1990 | Kurabayashi | 346/135.1 |
| 5,059,000 | 10/1991 | Kaneko et al. | 346/76 L |
| 5,103,332 | 4/1992 | Kaneko et al. | 346/76 PH |

FOREIGN PATENT DOCUMENTS

| | | | |
|---|---|---|---|
| 0321982 | 6/1989 | European Pat. Off. . | |
| 0139468 | 7/1985 | Japan | 400/120 |
| 0000576 | 1/1990 | Japan . | |

*Primary Examiner*—Benjamin R. Fuller

*Assistant Examiner*—Huan Tran

*Attorney, Agent, or Firm*—Fitzpatrick Cella, Harper & Scinto

[57] ABSTRACT

An apparatus for forming an image of the present invention comprises an image medium which is made of a heat-sensitive material in and from whcih an image can be thermally recordded and erased. The image medium has at least two display regions having different colors in the same face and having different thermal transition temperatures between a transparent state and a scattering state. A thermal signal applying member is employed for forming an image by thermally scanning said image medium which is characterized by applying to said medium a temperature controlled so that at least two differnt colors are displayed in a one-signal period of thermal scanning. The present invention also provides a method of forming an image using the image forming apparatus.

12 Claims, 6 Drawing Sheets

APPARATUS AND METHOD FOR FORMING COLOR IMAGE

BACKGROUND OF THE INVENTION

1. Field of the Invention

The present invention relates to an apparatus and a method for forming a color image having a heat-sensitive material which changes in its optical and physical states with a change in temperature.

2. Description of the Prior Art

Output moving images in televisions and VTR and interaction with computers, are generally displayed on display monitors, such as CRT (cathode ray tube) and TN (twisted nematic) liquid crystals. High-definition images, such as documents and figures formed by facsimiles, are output and displayed as hard copies printed out on paper.

Although a CRT outputs beautiful images in the case of output moving images, it causes a deterioration in visibility owing to the scanning lines caused by flickering or insufficient resolution in those images which are still for a long time.

In addition, although conventional liquid crystal displays such as TN liquid crystals or the like permit the formation of thinner devices, they involve the problem that the work of sandwiching a liquid crystal between glass substrates requires much time, and the image formed is dark.

The CRT and TN liquid crystals also have the problem that a beam or picture element voltage must be always accessed because there is no stable image memory even during the output of a still image.

On the contrary, images output on paper are obtained as stable memory images with high definition. However, the use of a large number of such images output on paper requires a substantial space for filing, and a waste of resources is realized by the disposal of many sheets of paper, which cannot be disregarded. In addition, there is the need for handling of ink and a toner, for processing such as development, fixing and the like, for maintenance and the supply of consumables.

SUMMARY OF THE INVENTION

Accordingly, it is an object of the present invention to provide an apparatus, method and medium for forming a color image which are capable of representing a high-definition color image, which is generally obtained only as a hard copy, with the same visibility as that of a hard copy.

The applicants previously proposed a display medium which is suitable for recording in a display region of one color in one-signal period of thermal scanning, Japanese Patent Application No 63-318610, which corresponds to application Ser. No. 287,152, filed Dec. 21, 1988. However, it is an object of the present invention to provide an apparatus and method for forming a color image in which recording is simultaneously and selectively made in at least two display regions having different colors in a one-signal period of thermal scanning, apart from the above-described application.

The present invention therefore provides an apparatus for forming images comprising an image medium which is made of a thermally recordable and erasable heat-sensitive material and which has at least two display regions having different colors on the same surface and having different temperatures of thermal transition between a transparent state and a scattering state; and a thermal signal applying means which forms an image by thermally scanning the image medium and which is characterized by applying to the medium temperatures which are controlled so that at least two different colors are displayed in a one-signal period of thermal scanning.

The present invention also provides a method of forming an image in which a thermal signal applying means for forming an image by thermally scanning an image medium applies at least two controlled temperatures to the image medium in a one-signal period of the thermal scanning so that at least two different colors are displayed in a one-signal period. The image medium of the invention comprises a thermally recordable and erasable heat-sensitive material and having at least two display regions having different colors on the same surface and having different temperatures of thermal transition between a transparent state and a state.

BRIEF DESCRIPTION OF THE DRAWINGS

FIGS. 7*a*-1, 7*a*-2 and 7*b* are drawings which show other forms of temperature signals applied to a medium in accordance with the present invention.

DESCRIPTION OF PREFERRED EMBODIMENTS

Figure 1:
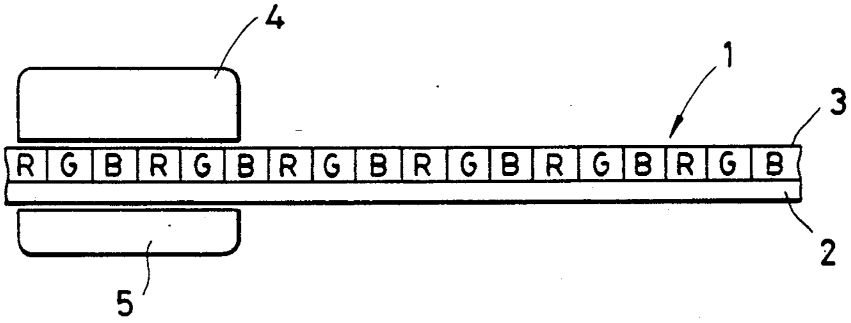
FIG. 1 is a schematic drawing of the arrangement of an image forming apparatus of the present invention.

FIG. 1 is a schematic drawing of the arrangement of an image forming apparatus in accordance with the present invention.

In the drawing, reference numeral 1 denotes a color image forming medium having layers comprising a glass, polyester or another transparent substrate 2 on which a heat-sensitive material, which contains coloring matter showing optical absorption at least in the visible region, for example, blue (B), green (G) and red (R) two-tone or non-axial dyes or pigments, is formed into a color pattern having a color mosaic or stripes by net point printing or another printing or coating method. Reference numeral 3 denotes a heat-sensitive material layer.

Reference numeral 4 denotes a thermal means (member) for applying signals to the medium. The thermal means may be either a thermal head for direct heating or a laser for indirect heating. Reference numeral 5 denotes a medium supporting means such as a platen or a platen roller which is provided corresponding to the thermal means.

The optimum heat-sensitive materials used for the color image forming medium are polymeric liquid crystals exhibiting the properties of thermotropic liquid crystals. Examples of such liquid crystals include socalled side-chain polymeric liquid crystals in which a low-molecular liquid crystal is added in a pendant form to a methacrylate polymer or siloxane polymer serving as a main chain, and main-chain polymeric liquid crystals such as polyester, polyamides and the like which are used in the field of high-strength, high-elasticity, heat-resistant fibers and resins. Such liquid crystals produce smectic, nematic, cholesteric and other phases in a liquid crystal state. Discotic liquid crystals can also be used as the heat-sensitive material. It is preferable to use the present invention are given below, the liquid crystals are not limited to them.

Each of the transition temperatures Tg described below between a glass phase and a liquid crystal phase is generally expressed by a value obtained by DSC measurement and indicates the inflection point of a DSC curve. Each of the transition temperatures T(iso) between a liquid crystal phase and an isotropic (Iso.) phase indicates the peak produced in the DSC measurement.

(I)

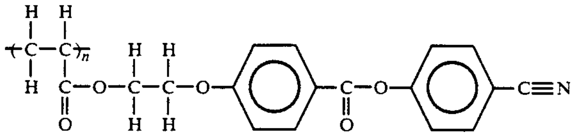

MW = 18,000

Glass 75° C. Liquid crystal phase 110° C. Iso.
(N)

(II)

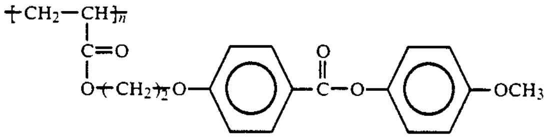

Glass 47° C. Liquid crystal phase 77° C. Iso.
(N)

(III)

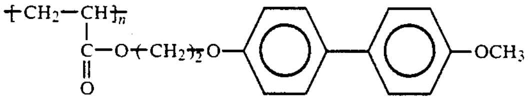

Glass 120° C. Liquid crystal phase 152° C. Iso.
(N)

(IV)

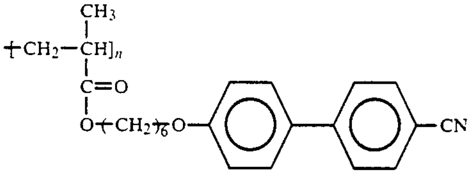

Glass 50° C. Liquid crystal phase 100° C. Iso.
(Sm)

(V)

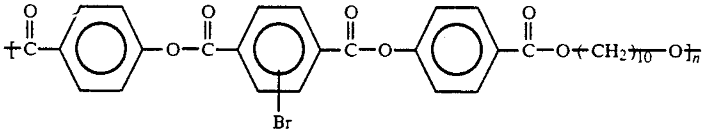

Glass 140° C. Liquid crystal phase 196° C. Iso.
(Sm)

(VI)

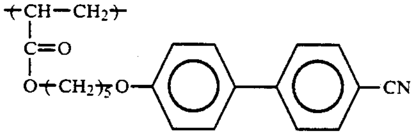

Glass 41° C. Liquid crystal phase 114° C. Iso.
(N)

polymeric liquid crystals into which asymmetric carbon atoms are introduced so that they have a phase showing SmC* and which exhibit good dielectric properties.

Although typical examples of polymeric liquid crystals that may be used as the image forming medium in Polymeric liquid crystals which are formed in such a manner that at least two kinds (dual) of side chains or main chains are copolymerized are exemplified. An example of such polymeric liquid crystals is as follows:

(VII)

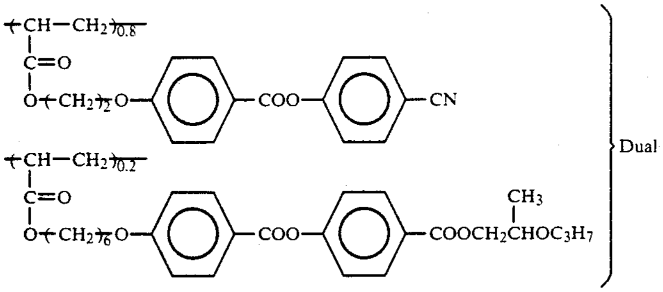

Dual copolymerization

Glass 55° C. Liquid cyrstal phase 88° C. Iso.

Examples of solvents used for forming films by coating such liquid crystals include dichloroethane, dimethylformamide, cyclohexane, tetrahydrofuran (THF), acetone, ethanol, other polar and non-polar solvents and solvent mixtures thereof. As a matter of course, the solvent used can be selected from these solvents in view of compatibility with the polymeric liquid crystal used, the material of a substrate on which the liquid crystal is coated, wetting with the surface layer provided on the surface of the substrate, and film formation properties thereof.

Any substrate which is subjected to non-orientation treatment or extraction with ethyl alcohol in a plurality of directions may be used as the substrate for the polymeric liquid crystal. However, in any case, the polymeric liquid crystal is preferably formed by coating the liquid crystal as a layer on a substrate having surfaces from which dirt is sufficiently removed.

In order to obtain a desired color, small amounts of dyes of various colors such as yellow (for example, "LSY-116" manufactured by Mitsubishi Chemical Industries, Ltd.), Magenta (LSR-401), cyan (SBL-335), green (a mixture of "LSY-116" and "SBL-335"), red (a mixture of "LSY-405" or "LSR-401" and "LSY-116") and the like may be mixed with the above-described various polymeric liquid crystals in the presence of a solvent. Unless otherwise indicated all dyes referred to herein are manufactured by Mitsubishi Chemical Industries, Ltd. The mixing of each of such dyes causes coloration. The thickness of the polymeric liquid crystal coating formed is 0.5 μm or more, preferably 2 to 15 μm.

In addition, in order to impart remarkable optical scattering properties to the colored polymeric liquid crystal layer formed, the amount of the dye mixed in the polymeric liquid crystal is 10% by weight or less, preferably 5% by weight or less, more preferably within the range of 1% by weight to 4% by weight, relative to that of the polymeric liquid crystal. The amount of the dye mixed is preferably about 1% by weight relative to that of the solvent used.

In the construction of the present invention, color dyes each having optical absorption at least in the visible region, for example, blue (B), red (R) and green (G) bicolor or non-axial dyes, are respectively mixed in regions having different temperatures of transition between a scattering state and a transparent state. In particular, when a polymeric liquid crystal is used in an image forming medium, the medium is formed by coating on a substrate a mixture obtained by respectively mixing dyes in polymeric liquid crystals having different temperatures T(iso) by a net point printing or another printing or coating method to form a color pattern ($PLC_B$, $PLC_R$, $PLC_G$) with a color mosaic or stripes in a regular or random arrangement.

A colored polymeric liquid crystal film can be formed by the following method:

Each of polymeric liquid crystal solids corresponding to the colors R, G, B is first ground at a temperature below the glass transition point. The thus-formed particles are sorted according to a particle size of 20 μm±10 μm, and particles respectively having the colors R, G, B are mixed and then coated so as to be uniformly dispersed in a layer.

The entire surface of the thus-formed layer is then baked at a temperature higher than the highest T(iso) among the temperatures T(iso) of the PLC regions respectively corresponding to the three colors to form a film.

In order to obtain each of desired colors, small amounts of dyes are respectively mixed in polymeric liquid crystals.

Figure 2:
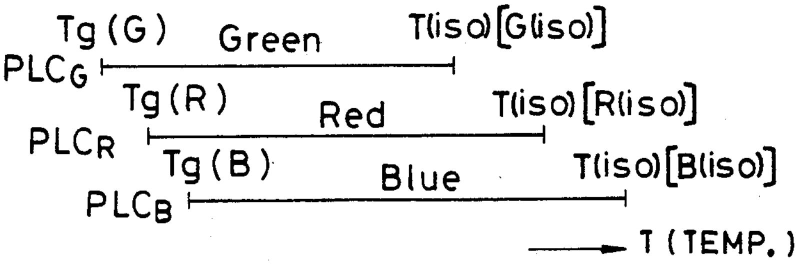
FIG. 2 is an explanatory view of the liquid crystal temperatures of $PLC_B$, $PLC_R$ and $PLC_G$.

FIG. 2 shows the relation between the liquid crystal temperature ranges of the $PLC_B$, $PLC_R$, $PLC_G$. In this relation, it is important that the temperature T(iso) of $PLC_B$, $PLC_R$ and $PLC_G$, i.e., B(iso), R(iso) and G(iso) shown in the drawing, are different from each other.

It is more preferable that the temperature difference between the isotropic phase transition temperature T(iso) and the glass transition point Tg of each of the regions in the polymeric liquid crystal is 40° C. or more, and that the difference between the isotropic phase transition temperatures T(iso) of the regions is at least 10° C.

The basic principle of the thermal function in the image forming medium is described in detail below by using as a typical example of polymeric liquid crystals a liquid crystal expressed by the above formula (I).

The polymeric liquid crystal is dissolved in, for example, dichloromethane, coated on a transparent polyester substrate, which had been washed with alcohol by using an applicator, and then allowed to stand for a 10 minutes in an atmosphere at about 95° C. to form a white, light scattering film film. The thickness of the thus-formed film 10 μm or more when the amount of the polymeric liquid crystal before coating is 20% by weight.

When a heat-sensitive head is operated on the thus-obtained white sheet, a transparent portion is fixed in accordance with a character or graphic pattern. When this sheet is placed on a black background having a optical density of 1.2, a black pattern is clearly displayed on the white sheet.

When the entire surface of the sheet on which the pattern is recorded is then heated to about 120° C., gradually cooled to about 90° C. and then allowed to stand for several seconds, the original white scattering state is recovered over the entire surface. When the sheet is cooled to room temperature, the scattering state is stably fixed to create a state wherein recording and display can be repeated.

The above-described phenomenon can be controlled on the basis of the fact that the polymeric liquid crystal can assume at least three states, i.e., a film state at a temperature below the glass transition point wherein a stable memory state is maintained, a liquid crystal film state which can be substantially moved to an optical scattering state, and an isotropic film state having an isotropic molecular arrangement at a higher temperature.

The basic process of recording or recovering the scattering state (erasing) is described in detail below with reference to FIG. 3.

Figure 3:
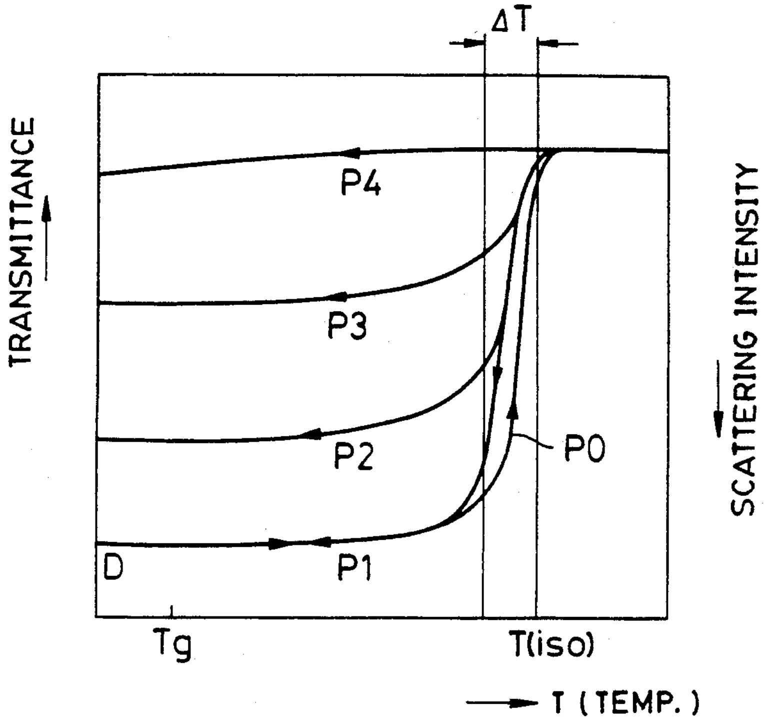
FIG. 3 is an explanatory view of a basic process of recording or recovering a scattering state.

FIG. 3 (and FIG. 4 described below) shows a recording process in a display region of one color in a one-line signal period for convenience of explanation. The recording process in the display region having at least two different colors in a one-line signal period in accordance with the present invention is described below with reference to the embodiment below (particularly FIGS. 5 to 7).

In FIG. 3, the scattering state is denoted by D. For example, if the liquid crystal is heated to a temperature higher than T(iso) by a heating means as a thermal head, a laser or the like, as shown by P0 the drawing, and then rapidly cooled, a light transmission state which is substantially the same as an isotropic state is fixed, as shown by P4 in the drawing.

On the other hand, if the polymeric liquid crystal is heated to a temperature higher than T(iso), as shown by P0 in the drawing, and then gradually cooled in such a manner that it is maintained in the liquid crystal temperature range from Tg to T(iso), particularly in a temperature range $\Delta T$ on the high temperature side, for a relatively long time (for example, 1 to several seconds), the original scattering state D is consequently recovered and stably maintained at a temperature below Tg.

If the liquid crystal is gradually cooled in such a manner that it is kept in the temperature range $\Delta T$ for a relatively short time (for example, 10 millisecond to several hundreds of milliseconds), intermediate transmission states can be realized, as shown by P2 and P3 in the drawing, in correspondence with degrees of cooling. Such intermediate transmission states can be used for representing gradation.

In other words, in this example, the transmittance or the scattering intensity can be controlled by changing the time the liquid crystal is maintained in the liquid crystal temperature range, particularly the temperature range T, after it has been heated to the isotropic state, and the scattering state can be stably maintained at a temperature below Tg.

Since the scattering behavior remarkably changes within the temperature range $\Delta T$ on the high temperature side of the liquid crystal temperature range, the time of holding in the temperature range $\Delta T$ is an important factor for determining the resulting scattering state (or transmission state). It is preferable that the material used has a temperature range $\Delta T$ of $\pm 5°$ C. to $\pm 10°$ C. from T(iso). When the medium is maintained in such a temperature range for a long time, a sufficient scattering state can be obtained even if the medium is then allowed to stand in air. Further, if the medium is maintained in a recording state and then heated to a temperature below the temperature range $\Delta T$, the state is hardly changed. The $\Delta T$ extends to the temperature near the rise or fall of the T(iso) peak observed in DSC measurement.

Figure 4:
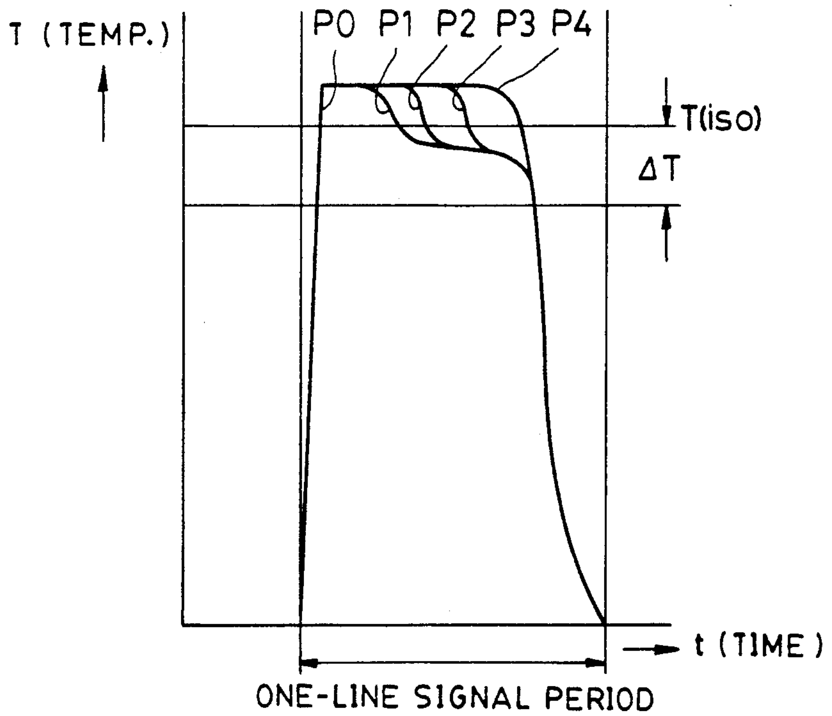
FIG. 4 is a drawing which shows waveforms of temperature application for obtaining each of the transmittance states shown in FIG. 3.

FIG. 4 shows the temperature application waveforms for obtaining the transmittance states shown in FIG. 3. In the drawing, T(iso), $\Delta T$ and P0 to P4 correspond to the temperature, the temperature range and the corresponding process temperatures, respectively, which are shown in FIG. 3. P1 to P4 respectively denote the process temperatures resulting from the control of the time the medium is maintained in the temperature range $\Delta T$. Such waveforms permit recording with gradation in a one-line signal period of a thermal means.

Figure 5:
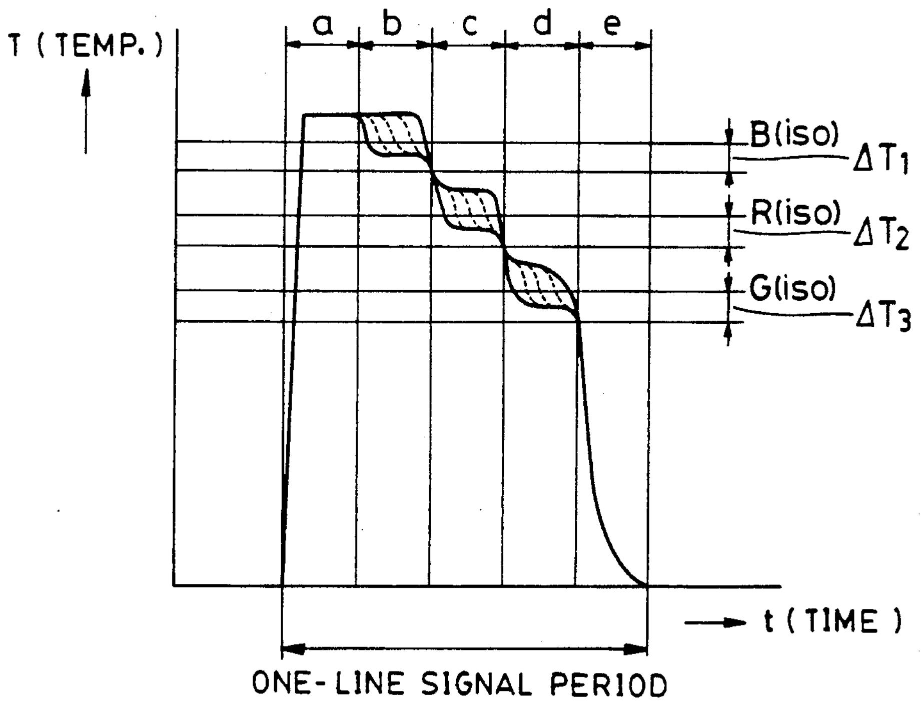
FIG. 5 is a drawing which shows waveforms of temperature application to a medium in accordance with the present invention.

FIG. 5 shows waveforms for applying temperatures to the color image forming medium and a key feature of the present invention.

In FIG. 5, a denotes the initialization signal section in the one-line heat scanning period of the thermal signal applying means 4 shown in FIG. 1 in which all the regions $PLC_B$, $PLC_R$ and $PLC_G$ are heated to a temperature higher than T(iso) to be put in a transparent state.

In the drawing, b denotes a section where the temperature applying waveform shown in FIG. 4 is applied to $PLC_B$ and where the recording state of $PLC_B$ is settled. In this section, both $PLC_R$ and $PLC_G$ are at the isotropic phase temperatures in a transparent state.

In the section c shown in the drawing, the waveform shown in FIG. 4 is applied to $PLC_R$. In this section, the highest temperature is lower than the value of B(iso)$-\Delta T_1$ shown in the drawing wherein $\Delta T_1$ is a temperature range where the state of $PLC_B$ is remarkably changed in the same way as in the above-described $\Delta T$. There is substantially no effect on the state of $PLC_B$ to which a signal has been always provided, however. In the section c, therefore, the recording state of $PLC_R$ only is settled, while $PLC_G$ is maintained in the transparent state.

In the next section d, the waveform shown in FIG. 4 is applied to $PLC_G$ so that the recording state of $PLC_G$ is settled. In this section, the recording temperature of $PLC_G$ is set to a temperature lower the value of R(iso)-$\Delta T2$, wherein $\Delta T2$ is a temperature range where the state of $PLC_G$ is remarkably changed in the same way as in $\Delta T2$. There is only a little effect on the recording states of $PLC_B$ and $PLC_R$.

The last section e is a cooling section of the thermal signal applying means in which the temperature is lowered to about room temperature.

In this way, the use of a thermal head as the thermal signal means permits the erasure of the prior image simultaneously with the formation of any desired color image having at least two colors, typically, in the one-line signal application period of the one-line thermal head.

In the process shown in FIG. 5, each of the difference between B(iso), R(iso) and G(iso) is preferably 10° C. or more in consideration of the $\Delta T$, and the separation of recorded colors is basically simplified as the temperature differences are increased.

The PLC regions need not always have the order of Tg of $Tg(B) > Tg(R) > Tg(G)$. It is preferable for retaining a semi-permanent stable memory of a recorded image that all the Tg values are higher than room temperature or the environmental temperature used. However, even if the Tg is lower than room temperature, when Tg is near room temperature (for example, room temperature—about 5° C.), a memory state can be maintained for a long time.

In order to record at a high speed, it is preferable to select as a medium raw material for each color a liquid crystal having a wide liquid crystal temperature range. The value of T(iso)—Tg is experimentally 30° C. or more, preferably 40° C. or more, and the speed of change from the isotropic phase to the scattering state is increased as the temperature region is increased.

This effect can be also obtained by adding a small amount of conventional low-molecular liquid crystal or another low-molecular compound to a polymeric liquid crystal or adding the above-described various dyes thereto. As a result, a medium having an appropriately wide liquid crystal temperature range is preferable.

Examples of liquid crystal temperatures set for respective colors in accordance with the above description are as follows:

$PLC_B$: Tg=60° C.−T(iso)=120° C.

$PLC_R$: Tg=50° C.−T(iso)=105° C.

$PLC_G$: Tg=40° C.−T(iso)=90° C.

The above-described example, which is an example of raw materials, can be realized by appropriately selecting a basic material and changing the degree of polymerization of a polymeric compound and the chemical structure of bonds between a main chain and mesogen.

An experimental example is described below to further illustrate the above relationships.

1% by weight of the dye LSR-401 (magenta) was mixed in the polymeric material (Tg 75° C. −T(iso) 110° C.), and the resultant mixture was then dissolved in a solvent (dichloroethane). The thus-formed solution was coated on a PET (polyethyleneterephthalate) film and then gradually cooled from 115° C. in a constant temperature bath to obtain Sample 1 in a scattering state. 1% by weight of the dye LSB-335 (cyan) was mixed in the material (IV) (Tg 50° C.-T(iso) 100° C.), and the resultant mixture was dissolved in a solvent in the same way as that described above. The thus-formed solution was then coated on a PET film and the gradually cooled from 105° C. to obtain Sample 2 in a scattering state.

An image comprising a transparent portion was formed on either of Samples 1 and 2 by using a thermal head under normal conditions. When both Samples were placed in the constant temperature bath again and gradually cooled from 102° C. therein, the recording state of Sample 1 was substantially maintained, while Sample 2 was returned to the original scattering state. When both Samples were gradually cooled from 115° C. again, they were returned to the scattering state.

1% by weight of the dye LSY-116 was then mixed in the polymeric liquid crystal (VII) (Tg 55° C.−T(iso) 88° C.), and a film was formed by the same method as that described above to form Sample 3. A transparent image was recorded on the thus-formed Sample 3 by the thermal head and then gradually cooled from 90° C. in the constant temperature bath together with Samples 1 and 2. As a result, Samples 1 and 2 were not changed, and Sample 3 was returned to the scattering state.

Figure 6:
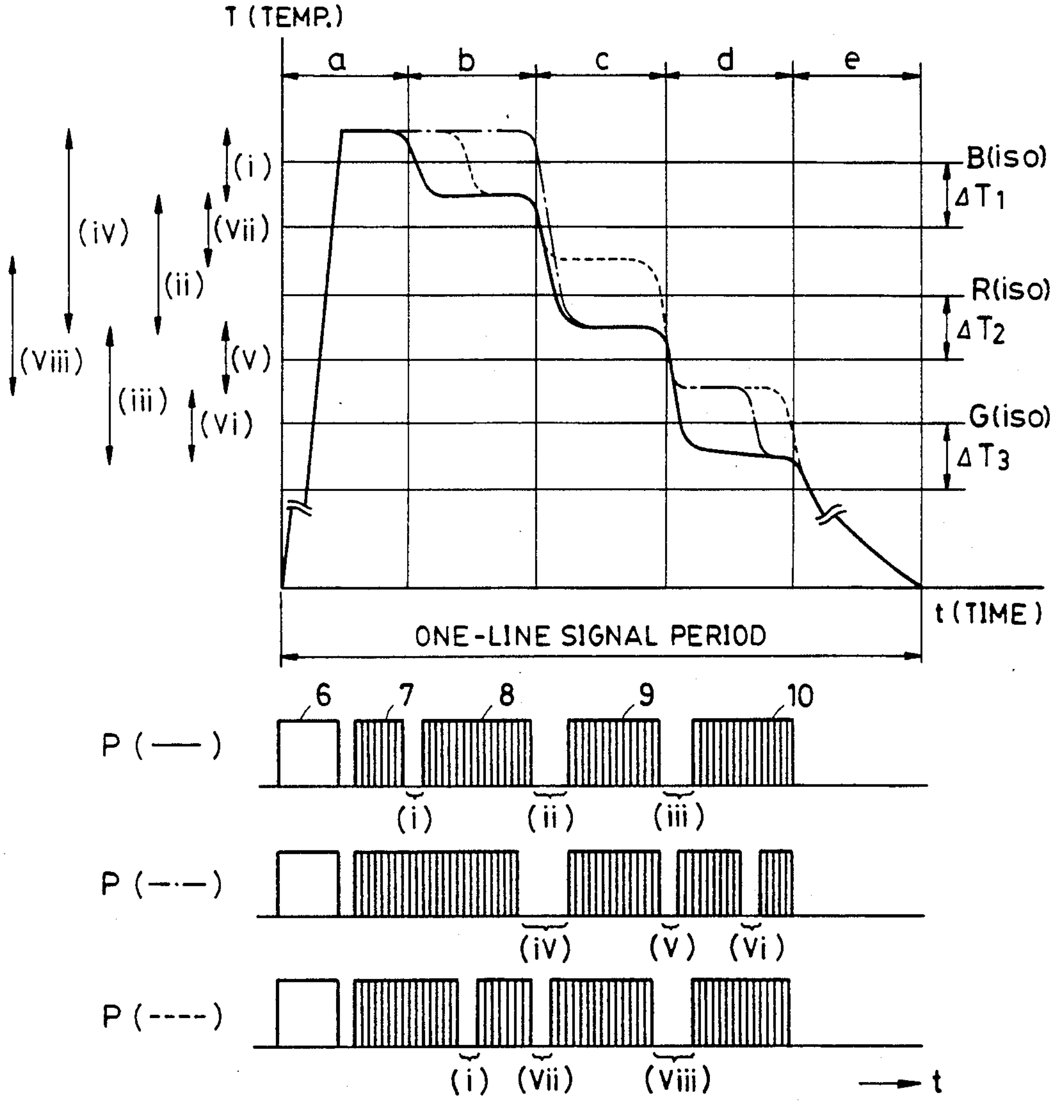
FIG. 6 is a drawing which shows an example of the form of temperature signals applied to a medium shown in FIG. 5.

In experiments for comparison between the characteristics of the media used, the polymeric material (VI) (Tg 41° C. −T(iso) 114° C.) was dissolved in a solvent, coated on PET in the same way as that described above and then dried with hot air to form a scattering film as Sample 4. The scattering speed of Sample 4 during gradual cooling from the isotropic phase was extremely higher than that of the scattering film formed by using the polymeric material (I) (Tg 75° C. −T(iso) 110°). FIG. 6 shows an example of a thermal head driving the form of application of temperatures to a medium as shown in FIG. 5. Examples of heat driving signals applied to the thermal head are shown in the lower half portion of FIG. 6. In the lower half portion, the pulse signals expressed by P (——), P (——) and P (—) are respectively used for obtaining the temperature driving forms shown by the solid line ——, one-dot chain line —— , dotted line . . . , respectively, which are shown in the upper half portion of FIG. 6. Each of the pulse signals corresponds to the time scale on the abscissa.

P (——) is first described below. In the section a, a relatively wide pulse 6 is applied for raising the temperature so as to heat the medium to a temperature higher than B(iso). A group 7 of narrow pulses are then applied to the medium so as to keep the temperature constant. In the section b of B recording, a cooling time (interval) (i) corresponding to a temperature width ↕ (i) is provided so that the temperature is controlled in the manner shown in the drawing, and a group 8 of narrow temperature holding pulses are then applied again so that the state (scattering state) of $PLC_B$ is established. In the section c, a cooling time (interval) (ii) corresponding to a temperature width ↕ (ii) is provided, and a group 9 of temperature holding pulses are then applied again so that the state (scattering state) of $PLC_R$ is established. In the same way, in the section d, a cooling time (interval) (iii) corresponding to a temperature width ↕ (iii) is provided, and a group 10 of temperature holding pulses are then applied so that the state (scattering state) of $PLC_G$ is established. The section e is a cooling section in which the temperature of the medium is further decreased. In the above-described process, all the regions $PLC_B$, $PLC_R$, $PLC_G$ are processed into the scattering state.

A description will now be given of P (—.—.). The section a is the same as that described above, and, in the section b, a group of temperature holding pulses are constantly applied so that $PLC_B$ is kept at a transparent state. In the next section c, a cooling time interval (iv) corresponding to a temperature width ↕ (iv) is provided, and a holding pulse group is then provided to obtain the state (scattering state) of $PLC_R$, while $PLC_B$ is transparent. In the section d, a cooling interval (v) corresponding to a temperature width ↕ (v) is provided, a cooling interval (vi) corresponding to a temperature width ↕ (vi) is provided at an intermediate position of the section d, and a temperature holding pulse group is then applied to the medium to obtain the state (midway scattering state) of $PLC_G$. The section d is then transferred to the cooling section e. It is consequently possible to record the substantially transparent state of $PLC_B$, the scattering state of $PLC_R$ and the midway scattering state of $PLC_G$.

In the process P (. . . ), the midway scattering state of $PLC_B$, the transparent state of $PLC_R$ and the transparent state of $PLC_G$ can be recorded in the same way as that described above.

The width and magnitude of each of the pulses, the width of each interval and the width of each of sections d to e can be selected in correspondence with the characteristics of the medium material and the thermal head used.

The aforementioned embodiment enables the colors on one line in the one-line signal period of the thermal head to be selected at one stroke.

The present invention can be also applied to a display panel in which a heater is formed in a matrix shape by applying the same temperature signals as those described above.

In the one line signal period in the temperature driving waveform shown in FIGS. 5 and 6, the rate can be set to 10 msec/line.

Figures 1, 7A:
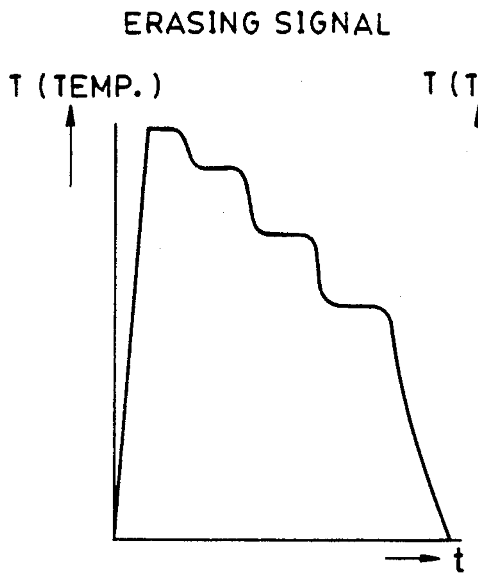
Figures 2, 7A:
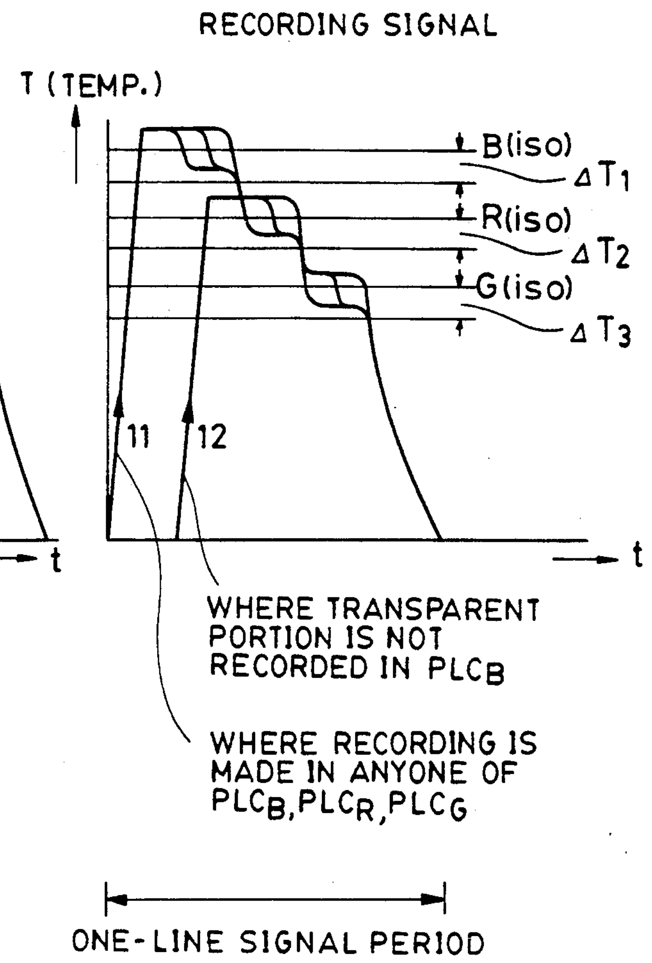
Figure 7B:
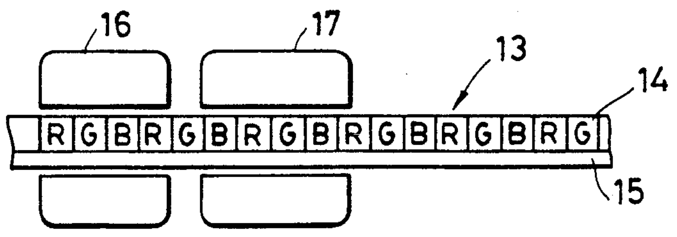

Another form of application of temperature signals to the medium in the present invention is shown in FIGS. 7(*a*) and 7(*b*).

FIG. 7(*a*-1) shows an erase signal and FIG. 7(*a*-2) shows a recording signal. In FIG. 7(*a*-2), reference numeral 11 denotes a signal in a case where a transparent portion is recorded in any one of the regions $PLC_B$, $PLC_R$ and $PLC_G$, and reference numeral 12 denotes a signal in a case where a transparent portion is not recorded in $PLC_B$. Erasure and recording may be separately effected by applying the erase signal shown in FIG. 7(*a*-1) and the recording signal shown in FIG. 7(*a*-2) to an image forming medium 13 having a polymeric liquid crystal layer 14 and a transparent substrate 15 by an erase means 16 and a recording means 17, respectively (refer to FIG. 7(*b*)).

Figure 8:
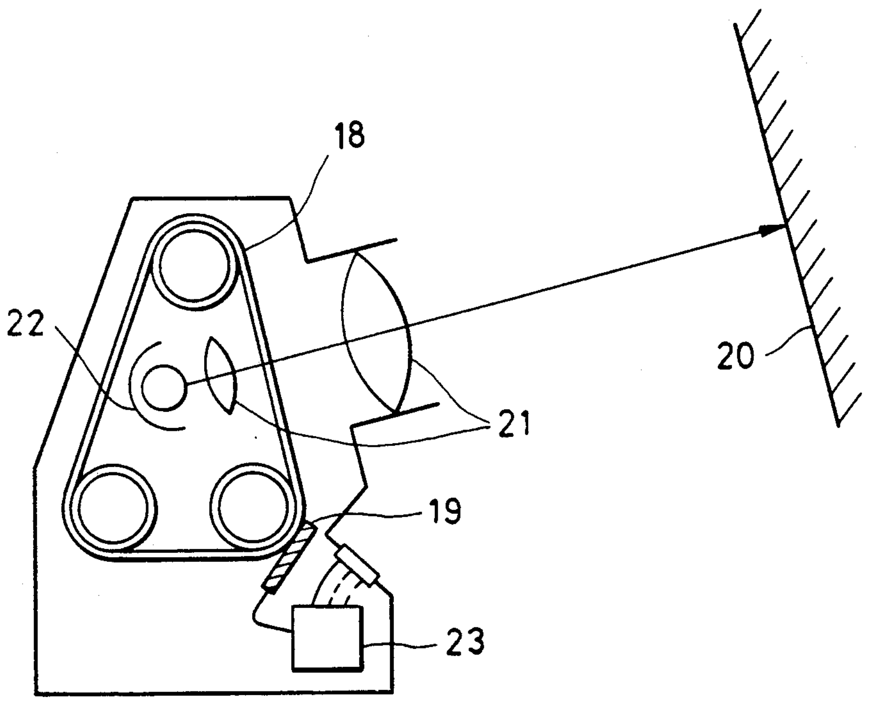
FIG. 8 is a drawing of an example of a display to which the present invention is applied.

FIG. 8 shows an example of application of the present invention to a display. In FIG. 8, reference numeral 18 denotes an image carrying medium belt which is, for example, a film-shaped medium belt having a polymeric liquid crystal layer; reference numeral 19, a thermal head; reference numeral 20, a screen; reference numeral 21, a lens; reference numeral 22, a light source; and reference numeral 23, a driver. For example, when the color image, which is formed by the thermal head 19 of the apparatus shown in FIG. 8 in such a manner that only $PLC_G$ corresponding to green is put into a transparent state, is projected to the screen 20 by transmission or reflection using an overhead projector or a slide projector, green light is projected corresponding to the above-described heat scanning, with the other dark regions. If heat scanning is performed in such a manner that all the polymeric liquid crystal regions corresponding to the colors B, R, G are made transparent, the regions respectively show the three colors and exhibit filter-like light transmission. When the thus-formed image is projected, a substantially white projected image is obtained.

The above-described projected images are basically negative images with a high contrast, and various kinds of colors can be combined. A full-color image can be formed by appropriately adjusting the width of each of the voltage pulses applied to the thermal head and applying the temperature signals shown in FIG. 5 to a medium.

The visibility of such images can be further improved by disposing a fluorescent lamp, EL (electroluminescence) panel or the like as a back light and directly sighting the color tone scattered by transmitted light.

As described above, in the present invention, recording is simultaneously and selectively made in at least two display regions having different colors in the one-signal period of heat scanning so that a high-definition color image can be displayed with the same visibility as that in hard copies.

What is claimed is:

1. An apparatus for forming an image comprising:

an image medium which is made of a thermally recordable and erasable heat-sensitive material and which has at least two display regions having different colors in a same surface and having different thermal transition temperature between a transparent state and a scattering state; and thermal signal applying means for forming an image by thermally scanning said image medium, said thermal signal applying means being characterized by sequentially applying to said medium thermal signals for controlling heating temperature and heating duration so that at least two different colors are displayed in a one-signal period of thermal scanning.

2. An apparatus for forming an image according to claim 1, wherein said heat-sensitive material has a polymeric liquid crystal material.

3. An apparatus for forming an image according to claim 1, wherein each of said display regions having different colors exhibits a temperature difference between an isotropic phase transition temperature T(iso) and a glass transition temperature Tg thereof of 40° C. or more.

4. An apparatus for forming an image according to claim 1, wherein the difference between isotropic phase transition temperatures T(iso) of said display regions having different colors is 10° C. or more.

5. An apparatus for forming an image according to claim 1, wherein different polymeric liquid crystal materials are respectively used in said display regions having different colors.

6. An apparatus for forming an image according to claim 1, wherein said thermal signal applying means is a thermal head or a laser.

7. A method of forming an image comprising the steps of:

(a) providing an image medium of a thermally recordable and erasable heat-sensitive material having at least two display regions having different colors on a same surface thereof and having different thermal transition temperatures between a transparent state and a scattering state; and (b) thermally scanning said image medium by sequentially applying thermal signals for controlling heating temperature and heating duration to said medium in a one-signal period of time so that at least two colors can be displayed in said one-signal period of time.

8. A method of forming an image according to claim 7 including employing as said heat-sensitive material, a polymeric liquid crystal material.

9. A method of forming an image according to claim 7, including employing said image medium wherein each of said display regions having different colors exhibits a temperature difference between an isotropic phase transition temperature T(iso) and a glass transition temperature Tg thereof of 40° C. or more.

10. A method of forming an image according to claim 7, wherein the difference between isotropic phase transition temperatures T(iso) of said display regions having different colors is 10° C. or more.

11. A method of forming an image according to claim 7, including employing different polymeric liquid crystal materials in said display regions having different colors.

12. A method of forming an image according to claim 7, including employing as said thermal signal applying means, a thermal head or a laser.

* * * * *

UNITED STATES PATENT AND TRADEMARK OFFICE

CERTIFICATE OF CORRECTION

PATENT NO. : 5,164,741

DATED : November 17, 1992

INVENTOR(S) : SHUZO KANEKO, ET AL.

It is certified that error appears in the above-identified patent and that said Letters Patent is hereby corrected as shown below:

On the title page, Item

IN [56] REFERENCES CITED

Under Attorney, Agent, or Firm: "Fitzpatrick Cella, Harper & Scinto" should read --Fitzpatrick, Cella, Harper & Scinto--.

IN [57] ABSTRACT

Line 4, "recordded" should read --recorded--.
Line 12, "differnt" should read --different--.

COLUMN 2

Line 17, "a state." should read --a scattering state.--.

COLUMN 4

Formula (I), "Glass 75°C. Liquid crystal phase 110°C. Iso."
(N)

should read

--Glass $\xrightarrow{75°C.}$ Liquid crystal phase $\xrightarrow{110°C.}$ Iso.--.
(N)

Formula (II), "Glass 47°C. Liquid crystal phase 77°C. Iso."
(N)

should read

--Glass $\xrightarrow{47°C.}$ Liquid crystal phase $\xrightarrow{77°C.}$ Iso.--.
(N)

UNITED STATES PATENT AND TRADEMARK OFFICE
CERTIFICATE OF CORRECTION

PATENT NO. : 5,164,741

DATED : November 17, 1992

INVENTOR(S) : SHUZO KANEKO, ET AL.

It is certified that error appears in the above-identified patent and that said Letters Patent is hereby corrected as shown below:

COLUMN 4

Formula (III),"Glass 120°C. Liquid crystal phase (N) 152°C. Iso."

should read

--Glass 120°C. Liquid crystal phase (N) 152°C. Iso.--.

Formula (IV), "Glass 50°C. Liquid crystal phase (N) 100°C. Iso."

should read

--Glass 50°C. Liquid crystal phase (N) 100°C. Iso.--.

Formula (V), "Glass 140°C. Liquid crystal phase (N) 196°C. Iso."

should read

--Glass 140°C. Liquid crystal phase (N) 196°C. Iso.--.

Formula (VI), "Glass 41°C. Liquid crystal phase (N) 114°C. Iso."

should read

--Glass 41°C. Liquid crystal phase (N) 114°C. Iso.--.

UNITED STATES PATENT AND TRADEMARK OFFICE

CERTIFICATE OF CORRECTION

PATENT NO. : 5,164,741

DATED : November 17, 1992

INVENTOR(S) : SHUZO KANEKO, ET AL.

It is certified that error appears in the above-identified patent and that said Letters Patent is hereby corrected as shown below:

COLUMN 5

Formula (VII), "Glass 55°C. Liquid crystal phase (N) 88°C. Iso."

should read

--Glass 55°C. Liquid crystal phase (N) 88°C. Iso.--.

COLUMN 6

Line 37, "temperature" should read --temperatures--.
Line 54, "a" should read --about--.
Line 56, "film film." should read --film.--.
Line 63, "having a" should read --having an--.

COLUMN 7

Line 44, "10 millisecond" should read --10 milliseconds--.
Line 68, "heated" should read --cooled--.

COLUMN 8

Line 43, "ΔT2" (both occurrences) should read --$\Delta T_2$--.
Line 45, "ΔT2" should read --$\Delta T_2$--.
Line 57, "difference" should read --differences--.

COLUMN 9

Line 40, "the" should read --then--.

CERTIFICATE OF CORRECTION

PATENT NO. : 5,164,741

DATED : November 17, 1992

INVENTOR(S) : SHUZO KANEKO, ET AL.

It is certified that error appears in the above-identified patent and that said Letters Patent is hereby corrected as shown below:

COLUMN 10

Line 7, "P(————) and P(—)" should read --P(-·-·-·) and P(···)--.

Line 10, "chain line ———" should read --chain line -·-·-·-·.

COLUMN 11

Line 5, "one line" should read --one-line--.

COLUMN 12

Line 2, "temperature" should read --temperatures--.

Signed and Sealed this

Fifth Day of July, 1994

Attest:

BRUCE LEHMAN

Attesting Officer

Commissioner of Patents and Trademarks